United States Patent
Sommer et al.

(10) Patent No.: US 8,138,632 B2
(45) Date of Patent: Mar. 20, 2012

(54) CONTROL METHOD FOR REDUNDANT USE IN THE EVENT OF A FAULT IN A POLYPHASE CONVERTER WITH DISTRIBUTED ENERGY STORES

(75) Inventors: Rainer Sommer, Heroldsbach (DE); Marc Hiller, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 236 days.

(21) Appl. No.: 12/067,575

(22) PCT Filed: Aug. 2, 2006

(86) PCT No.: PCT/EP2006/064943
§ 371 (c)(1),
(2), (4) Date: Mar. 20, 2008

(87) PCT Pub. No.: WO2007/033850
PCT Pub. Date: Mar. 29, 2007

(65) Prior Publication Data
US 2008/0259661 A1    Oct. 23, 2008

(30) Foreign Application Priority Data
Sep. 21, 2005  (DE) .......................... 10 2005 045 091

(51) Int. Cl.
*H02J 3/00* (2006.01)
(52) U.S. Cl. ........................................... 307/87
(58) Field of Classification Search ...... 307/87
See application file for complete search history.

(56) References Cited

U.S. PATENT DOCUMENTS

| | | | |
|---|---|---|---|
| 5,986,909 A | 11/1999 | Hammond et al. | |
| 6,222,284 B1 | 4/2001 | Hammond et al. | |
| 7,269,037 B2 * | 9/2007 | Marquardt | 363/71 |
| 7,577,008 B2 | 8/2009 | Hiller | |
| 7,835,166 B2 | 11/2010 | Hiller | |

(Continued)

FOREIGN PATENT DOCUMENTS

DE    101 03 031 A1    7/2002
(Continued)

OTHER PUBLICATIONS

Richardeau, F.; Baudesson, P.; Maynard, T. A.: Failures-tolerance and remedial strategies of a PWM multicell inverter, Power Electronics, IEEE Transactions on vol. 17, Issue 6, Nov. 2002, pp. 905-912.

*Primary Examiner* — Jared Fureman
*Assistant Examiner* — Dru Parries
(74) *Attorney, Agent, or Firm* — Henry M. Feiereisen; Ursula B. Day

(57) ABSTRACT

The invention relates to a method for controlling a power converter having at least two phase modules, which each have an upper and a lower valve branch, each having at least three series-connected two-pole subsystems, in the event of failure of at least one subsystem of a valve branch of a phase module. According to the invention, the valve branch (T1, T6) with the failed subsystem (10) is determined, and in each case a subsystem (10) of a valve branch (T1, T6), which corresponds to the faulty valve branch (T1, T6), of any fault-free phase module (100) is driven such that its terminal voltages (UX21) are in each case zero. A polyphase power converter with distributed energy stores (9) is therefore operated with redundancy.

2 Claims, 7 Drawing Sheets

U.S. PATENT DOCUMENTS

| | | |
|---|---|---|
| 7,924,585 B2 | 4/2011 | Sommer |
| 2004/0145337 A1 | 7/2004 | Morishita |
| 2005/0083716 A1 | 4/2005 | Marquardt |
| 2008/0232145 A1 | 9/2008 | Hiller et al. |
| 2011/0018481 A1 | 1/2011 | Hiller |
| 2011/0049994 A1 | 3/2011 | Hiller et al. |
| 2011/0089873 A1 | 4/2011 | Hiller et al. |
| 2011/0134666 A1 | 6/2011 | Hiller |
| 2011/0134667 A1 | 6/2011 | Hiller |

FOREIGN PATENT DOCUMENTS

| | | |
|---|---|---|
| JP | 2000060142 A | 2/2000 |

* cited by examiner

CONTROL METHOD FOR REDUNDANT USE IN THE EVENT OF A FAULT IN A POLYPHASE CONVERTER WITH DISTRIBUTED ENERGY STORES

BACKGROUND OF THE INVENTION

The invention relates to a method for controlling a converter having at least two phase modules, which each have an upper and a lower valve branch which each have at least three series-connected two-pole subsystems, in the event of failure of at least one subsystem in one valve branch of a phase module.

One such converter circuit of this generic type is known from DE 101 03 031 A1, and an equivalent circuit of a converter circuit such as this is illustrated in more detail in FIG. 1. According to this equivalent circuit, this known converter circuit has three phase modules, which are each annotated 100. On the DC voltage side, these phase modules 100 are each electrically conductively connected to a positive and a negative DC voltage bulbar $P_0$ and $N_0$. There is a DC voltage, which is not annotated in any more detail, between these two DC voltage busbars $P_0$ and $N_0$. Each phase module 100, which forms one bridge arm of the polyphase converter, has an upper and a lower bridge arm which (since these bridge arm elements each represent one converter valve of the polyphase converter with distributed energy stores) are referred to in the following text as the respective valve branches T1, T3, T5 and T2, T4, T6. Each of these valve branches T1 to T6 has a number of two-pole subsystems 10, which are electrically connected in series. Four of these subsystems 10 are illustrated in this equivalent circuit. Each junction point between two valve branches T1 and T2; T3 and T4 and T5 and T6, respectively, of a phase module 100 forms a respective connection L1, L2 or L3 on the AC voltage side of this phase module 100. Since, in this illustration, the converter circuit has three phase modules 100, a three-phase load, for example a three-phase motor, can be connected to their connections L1, L2 and L3 on the AC voltage side, also referred to as load connections.

FIG. 2 shows an equivalent circuit of a known embodiment of a two-pole subsystem 10 in more detail. The circuit arrangement shown in FIG. 3 represents a functionally completely equivalent variant, which is likewise known from DE 101 03 031 A1. This known two-pole subsystem 10 has two semiconductor switches 1 and 3 which can be turned off, two diodes 2 and 4 and a unipolar energy storage capacitor 9. The two semiconductor switches 1 and 3 which can be turned off are electrically connected in series, with this series circuit being connected electrically in parallel with the energy storage capacitor 9. One of the two diodes 2 and 4 is electrically connected in parallel with each semiconductor switch 1 and 3 which can be turned off, such that these diodes 2 and 4 are connected back-to-back in parallel with the corresponding semiconductor switch 1 or 3 which can be turned off. The unipolar energy storage capacitor 9 in the subsystem 10 is either in the form of a capacitor or a capacitor bank comprising a plurality of such capacitors, with a resultant capacitance $C_o$. The connecting point of the emitter of the semiconductor switch 1 which can be turned off and the anode of the diode 2 forms a connecting terminal X1 of the subsystem 10. The connecting point of the two semiconductor switches 1 and 3 which can be turned off and of the two diodes 2 and 4 form a second connecting terminal X2 of the subsystem 10.

In the embodiment of the subsystem 10 shown in FIG. 3, this connecting point forms the first connecting terminal X1. The connecting point of the collector of the semiconductor switch 1 which can be turned off and the cathode of the diode 2 forms the second connecting terminal X2 of the subsystem 10.

In both illustrations of the two embodiments of the subsystem 10, insulated gate bipolar transistors (IGBTs) are used, as illustrated in FIGS. 2 and 3, as semiconductor switches 1 and 3 which can be turned off. MOS field-effect transistors, also referred to as MOSFETs, can likewise be used. In addition, gate turn off thyristors, also referred to as GTO thyristors, or integrated gate commutated thyristors (IGCT) may also be used.

According to IDE 101 03 031 A1, the subsystems 10 of each phase module 100 of the converter circuit shown in FIG. 1 may be switched to a switching state I, II and III. In the switching state I, the semiconductor switch 1 which can be turned off is switched on, and the semiconductor switch 3 which can be turned off is switched off. A terminal voltage $U_{X21}$, which is produced between the connecting terminals X1 and X2, of the subsystem 10 is therefore equal to zero. In the switching state II, the semiconductor switch 1 which can be turned off is switched off, and the semiconductor switch 3 which can be turned off is switched on. In this switching state II, the terminal voltage $U_{X21}$ that is present is equal to the capacitor voltage $U_C$ across the energy storage capacitor 9. In the switching state III, both semiconductor switches 1 and 3 which can be turned off are switched off, and the capacitor voltage $U_C$ across the energy storage capacitor 9 is constant.

In order to allow this converter with distributed energy stores 9 to be operated redundantly as shown in FIG. 1, it is necessary to ensure that a faulty subsystem 10 is permanently shorted at its terminals X1 and X2. This means that the terminal voltage $U_{X21}$ of the faulty subsystem 10 is zero irrespective of the current direction through the terminals X1 and X2.

A failure of a semiconductor switch 1 or 3 which can be turned off and is provided in the subsystem 10, or of an associated drive circuit, results in this subsystem 10 not operating correctly. Further possible reasons for malfunctions include faults in the associated drive circuit of the semiconductor switches, their power supply, communication and measured-value recording. This means that the subsystem 10 can no longer be switched as desired to one of the possible switching states I, II or III. The shorting of the connections X1 and X2 of the subsystem 10 means that no more power is supplied to this subsystem 10. In consequence, consequential damage such as overheating and fire in the event of further operation of the converter cannot reliably be precluded. A conductive connection in the form of a short between the connecting terminals X1 and X2 of a faulty subsystem 10 such as this must carry at least the operating current of a valve branch T1, . . . , T6 of the phase module 100 in which the faulty subsystem 10 is connected, safely and without overheating. The prior national patent application with the internal file reference 2005P12103 DE indicates how a faulty subsystem 10 can be safely shorted in order that this known converter with distributed energy stores can still be operated in a redundant form.

The following explanation is based on the assumption that the energy storage capacitors 9 of all the subsystems 10 are each at the same voltage $U_C$. Methods for initial production of this state and for its maintenance during operation are likewise known from DE 101 03 031 A1. FIG. 4 shows a graph, plotted against time t, of a profile of the potential difference $U_{LN}$ between the terminal L of a phase module 100 and a selected reference ground potential N. FIG. 5 shows a graph, plotted against time t, of a profile of the potential difference $U_{PL}$ between the terminal P and a load connection L. These two potential profiles $U_{LN}$ and $U_{PL}$ are normalized with respect to the voltage $U_C$ of the energy storage capacitors 9 in the subsystems 10. One subsystem 10 of the four subsystems 10 in the respective valve branch T2 or T1 is in each case switched on and off, or turned off and on, at the respective times t2, t3, t4, t5 or t7, t8, t9 and t10 in accordance with these normalized potential profiles $U_{LN}/U_C(t)$ and $U_{PL}/U_C(t)$. Switching on in this case corresponds to a change from the switching state I to the switching state II. Switching off corresponds to a change from the switching state II to the switching state I. These two graphs each show one period Tp of the normalized potential profile $U_{LN}/U_C(t)$ and $U_{PL}/U_C(t)$. Corresponding components of harmonic or DC voltage components in each of the output voltages $U_{LN}$ of the phase modules 100 of the polyphase converter with distributed energy stores 9 are canceled out in the event of a balanced three-phase voltage system in the difference voltages between any two phase-shifted output voltages $U_{L1N}$, $U_{L2N}$ or $U_{L3N}$. These two normalized potential profiles $U_{LN}/U_C(t)$ and $U_{PL}/U_C(t)$ likewise show that the sum of the normalized potentials at any time is four. This means that the DC voltage between the DC voltage busbars $P_0$ and $N_0$ always corresponds to a constant number of subsystems 10 in the switching state II multiplied by the capacitor voltage $U_C$ across the capacitor 9. In the situation illustrated by way of example, this number corresponds to the number of subsystems 10 of the converter in the valve branches T1, . . . , T6, as shown in FIG. 1. By way of example, the four subsystems 10 of the valve branch T1 are all in the switching state II ($U_{x21}=U_C$) and the four subsystems 10 in the valve branch T2 of the corresponding phase module are all in the switching state I ($U_{x21}=0$) at the times t0 and t1. One submodule 10 of the valve branch T1 in each case changes its switching state from II to I at the times t2, t3, t4 and t5 while, in contrast, one subsystem 10 of the valve branch T2 in each case changes its switching state from I to II. If one subsystem 10 of a respective valve branch T1, T2; T3, T4 or T5, T6 of a phase module 100 in the polyphase converter as shown in FIG. 1 now fails because of some fault, then at least one of the three output voltages $U_{L1N}$, $U_{L2N}$ or $U_{L3N}$ of this polyphase converter with distributed energy stores 9 has harmonic and/or DC voltage components which, in some circumstances, can lead to this converter being turned off, as shown in FIG. 1.

SUMMARY OF THE INVENTION

The invention is now based on the object of specifying a control method by means of which the balance conditions can be maintained even in the event of a fault in at least one subsystem of a phase module of a converter with distributed energy stores.

According to the invention, this object is achieved by a method for controlling a converter having at least two phase modules, which have an upper and a lower valve branch which each have at least three series-connected two-pole subsystems, in the event of failure of at least one subsystem in one valve branch, with the valve branch with the failed subsystem being determined, and with one subsystem of a valve branch which corresponds to the faulty valve branch in each sound phase module in each case being driven such that their terminal voltages are each zero.

Since, according to the invention in the sound phase modules of the polyphase converter with distributed energy stores, one subsystem of a valve branch which corresponds to the valve branch with the faulty subsystem is in each case driven such that their terminal voltages are zero while the fault is present, all the output voltages of the converter with distributed energy stores are the same again, so that their difference voltages no longer have any harmonic and/or DC voltage components which are divisible by three.

In one advantageous method, a subsystem of a valve branch which corresponds to the faulty valve branch in the faulty phase module is driven such that its terminal voltage is equal to a capacitor voltage in the subsystem. In consequence, the output voltage of this faulty phase module is once again balanced with respect to the mid-value of a fundamental of this staircase output voltage. A corresponding procedure is adopted in the sound phase modules, so that the three output voltages of a three-phase converter with distributed energy stores once again form a balanced three-phase voltage system. In addition, the value of the intermediate-circuit voltage corresponds to the value of the intermediate-circuit voltage when no fault is present, so that the voltage load on the semiconductor switches which can be turned off in the systems likewise corresponds to the voltage load in the sound state.

In a further advantageous method, the switching times of the control signals for the subsystems of the valve branches of the phase modules of the polyphase converter with distributed energy stores are offset in time. This time offset between the control signals for the subsystems of each phase module means that the undisturbed amplitude profile of a fundamental of a phase output voltage is maintained approximately in the event of a fault.

This control method according to the invention allows the output voltages of the phase modules of a polyphase converter with distributed energy stores to be maintained even in the event of a fault. This converter can therefore be operated redundantly. When a polyphase load is connected to this polyphase converter with distributed energy stores, it is not possible to tell whether and how many subsystems in one valve branch of a phase module of this polyphase converter are faulty. All that happens is that this polyphase output voltage system has a reduced amplitude with an unchanged operating point, and apart from this there is no difference from the operating point when no fault is present.

BRIEF DESCRIPTION OF THE DRAWING

In order to explain the invention further, reference is made to the drawing, which schematically illustrates a plurality of embodiments of a method according to the invention for controlling a polyphase converter with distributed energy stores, and in which.

DETAILED DESCRIPTION OF PREFERRED EMBODIMENTS

Figure 1:
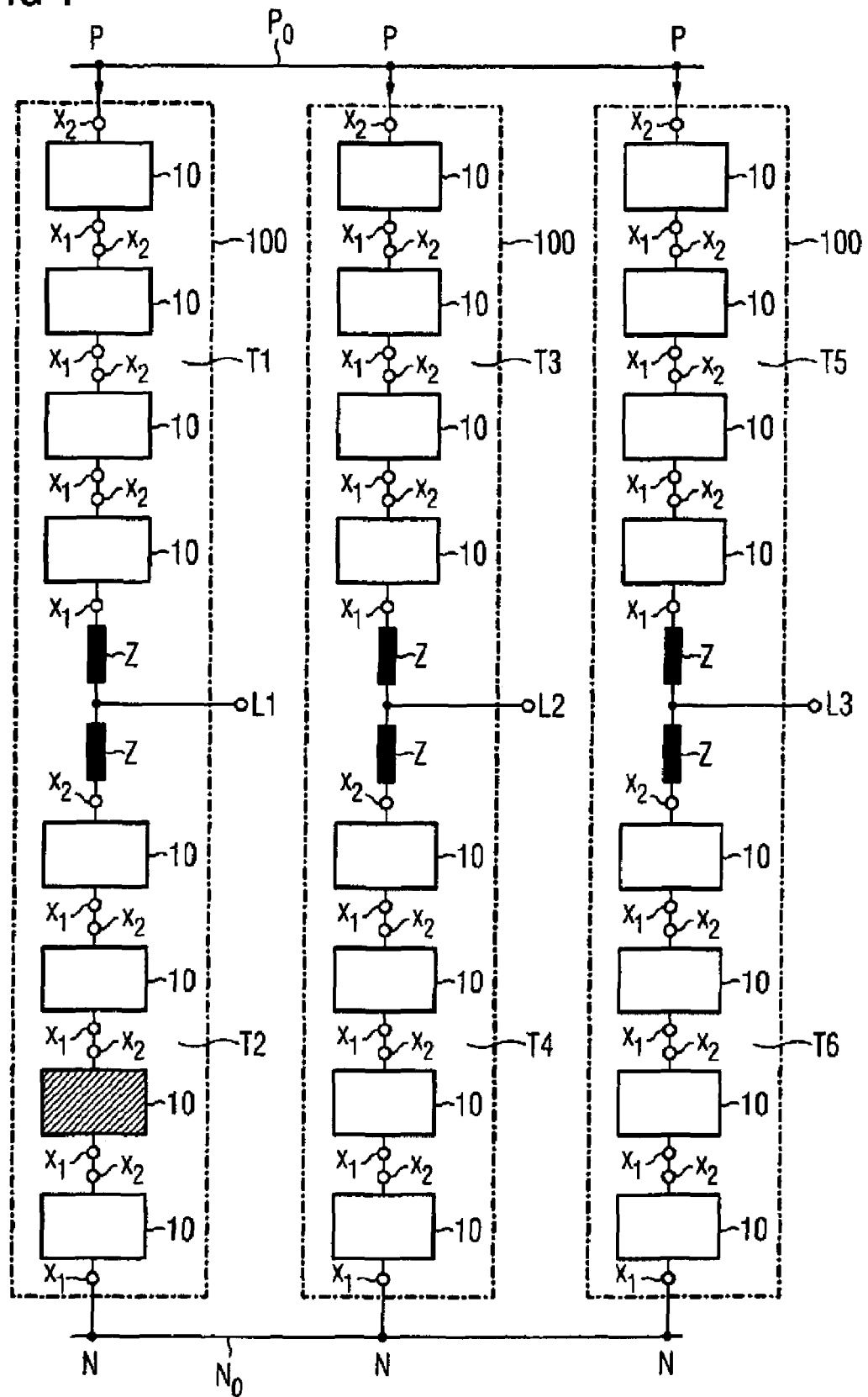
FIG. 1 shows an equivalent circuit of a known converter circuit with distributed energy stores.
Figure 2:
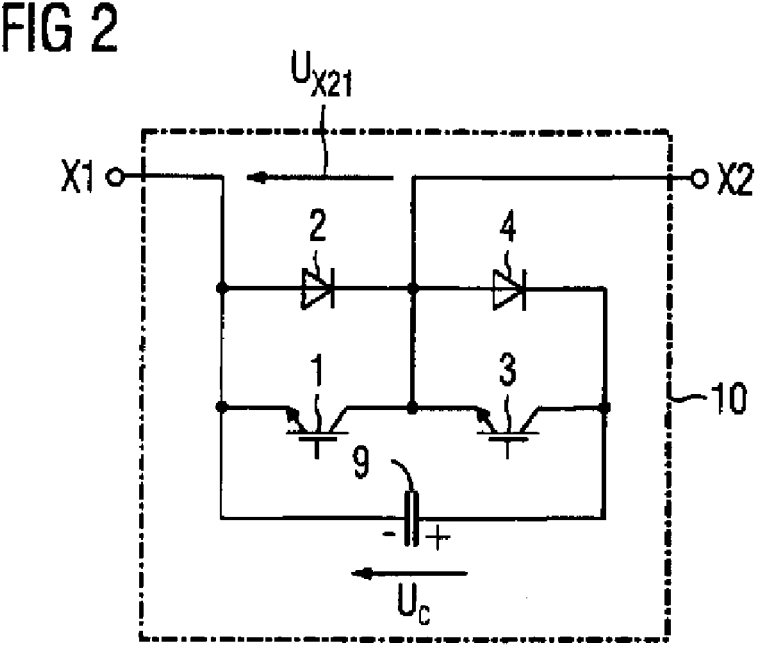
FIG. 2 shows an equivalent circuit of a first embodiment of a known subsystem.
Figure 3:
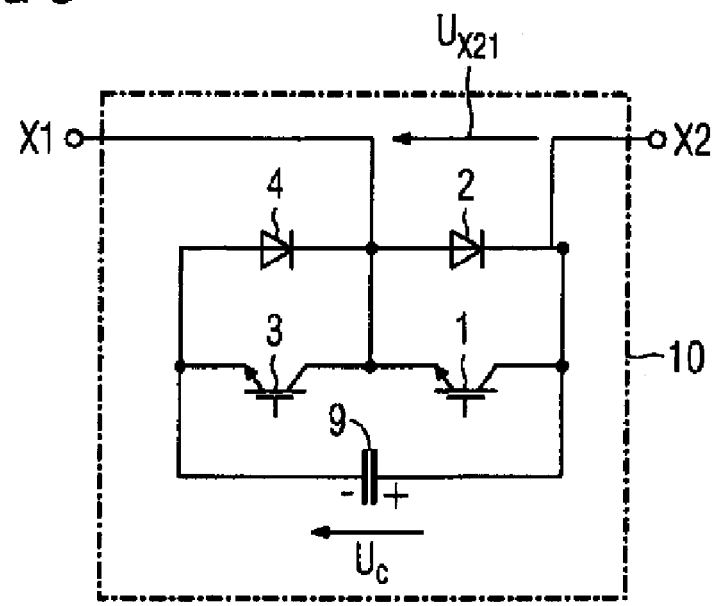
FIG. 3 shows an equivalent circuit of a second embodiment of a known subsystem, FIGS. 4 and 5 each show a graph plotted against time t of normalized potential profiles on the two valve branches of a phase module of the converter shown in FIG. 1, FIGS. 6 and 7 show the potential profiles as shown in FIGS. 4 and 5, in each case in a graph plotted against time t, in the event of failure of one subsystem in a lower valve branch of the converter as shown in FIG. 1, FIGS. 8 and 9 show the potential profiles as shown in FIGS. 4 and 5, in each case in a graph plotted against time t, in the event of failure of a subsystem in an upper valve branch of the converter shown in FIG. 1, FIGS. 10 and 11 show the potential profiles as shown in FIGS. 6 and 7, in each case in a graph plotted against time t, in which the switching times of the control signals are additionally offset in time.
Figure 4:
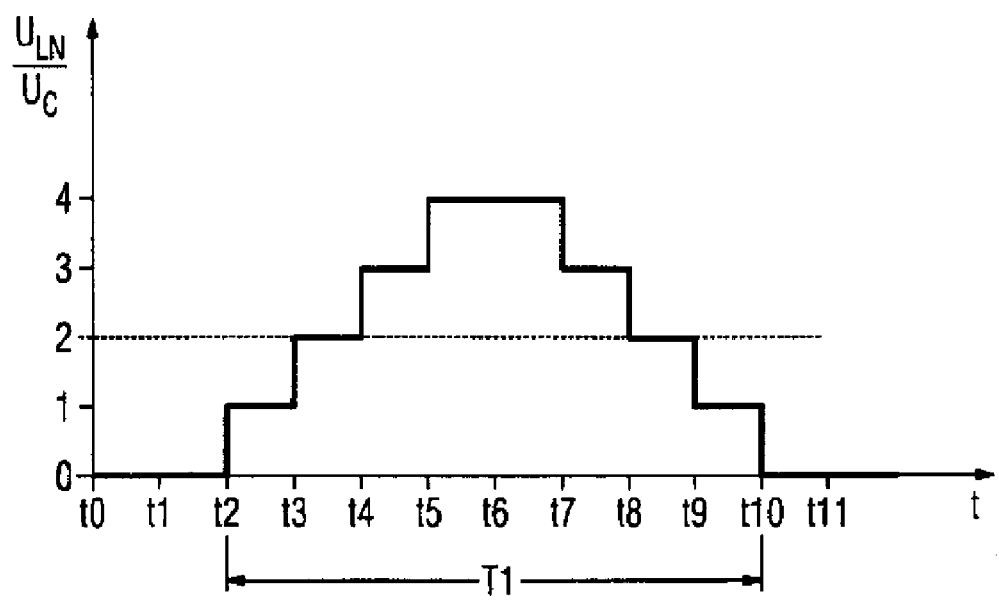
Figure 5:
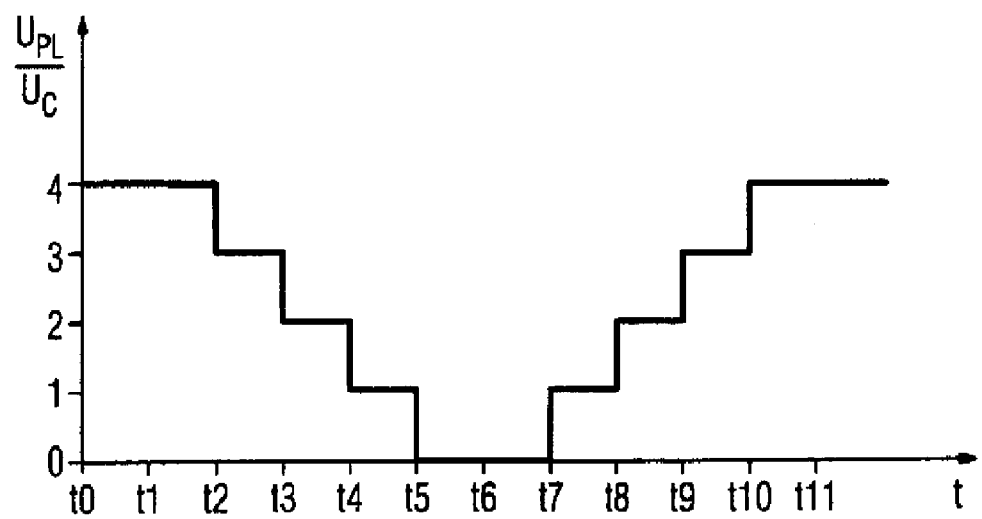
Figure 6:
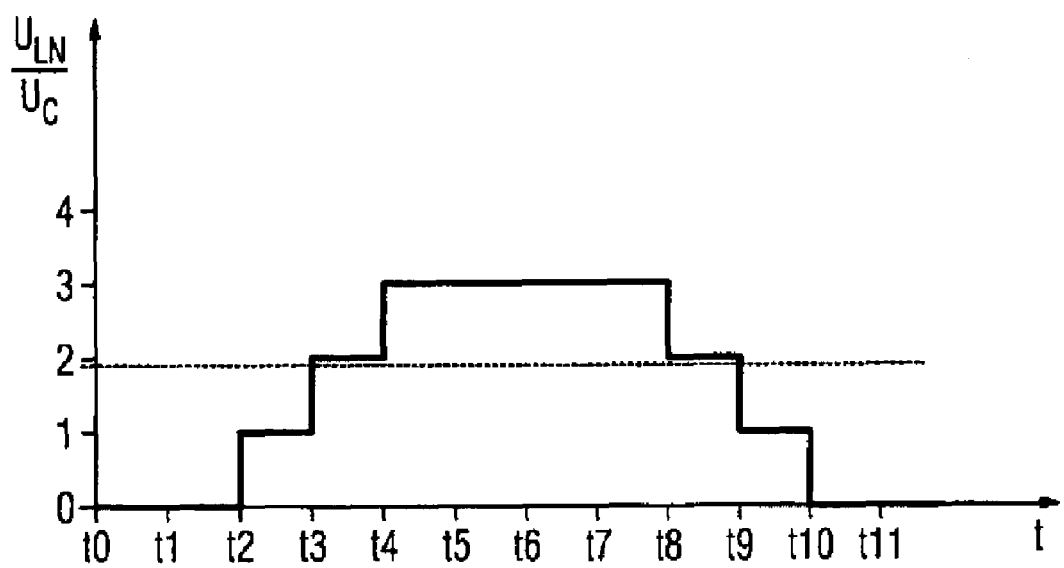

It is now assumed that one subsystem 10 in the valve branch T2 of the phase module 100 of the converter with distributed energy stores 9 as shown in FIG. 1 is safely shorted because of some fault. This faulty subsystem 10 is identified by means of shading in the equivalent circuit shown in FIG. 1. Only three subsystems 10 can therefore be used to generate the time profile of the normalized output potential $U_{L1N}/U_C(t)$ while, in contrast, four subsystems 10 are, however, still used to generate the time profile of the normalized potential $U_{PL1}$. This means that the potential profile $U_{L1N}/U_C(t)$ has one potential step less, corresponding to FIG. 4. This means that this potential profile $U_{L1N}/U_C(t)$ corresponds to the potential profile $U_{L1N}/U_C(t)$ shown in the graph in FIG. 6. The faulty system 10 in the valve branch T2 has changed nothing on the potential profile $U_{PL1}/U_C(t)$, so that this potential profile $U_{PL1}/U_C(t)$ still has a corresponding potential profile to $U_{PL1}/U_C(t)$ as shown in the graph in FIG. 5. In consequence, the DC voltage between the DC voltage busbars $P_0$ and $N_0$ for two time units t6-t5 and t7-t6 in this faulty phase module 100 is equal to $3 \cdot U_C$ in comparison to $4 \cdot U_C$ in the sound phase modules 100. Since the DC voltage between the DC voltage busbars $P_0$ and $N_0$ is used, a higher valve current flows in the faulty phase module 100 and additionally loads the components of each subsystem 10 in this faulty phase module 100. If this valve current exceeds the maximum permissible current values of a component of a subsystem 10 in this phase module 100, the polyphase converter with distributed energy stores 9 is switched off because of overcurrent.

Figure 9:
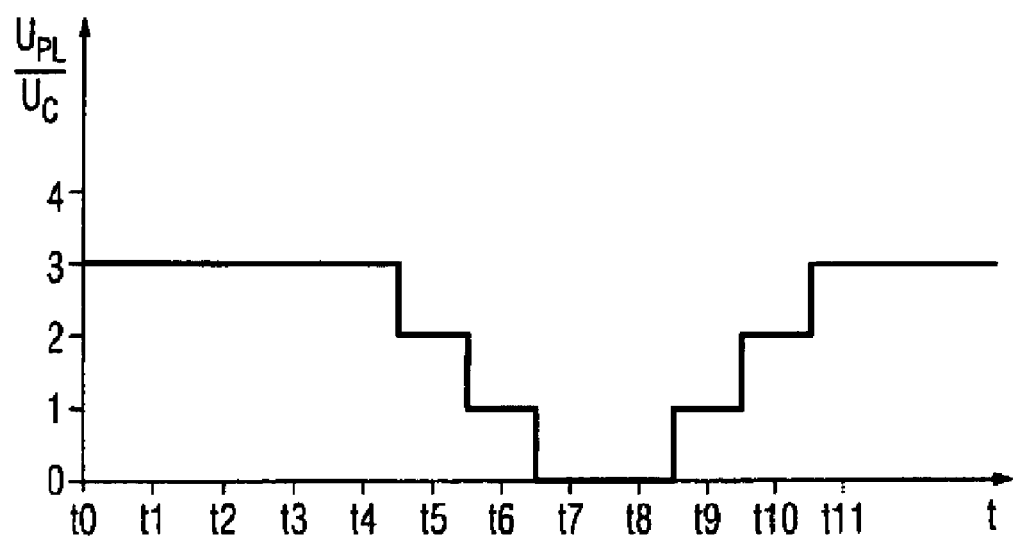
Figure 10:
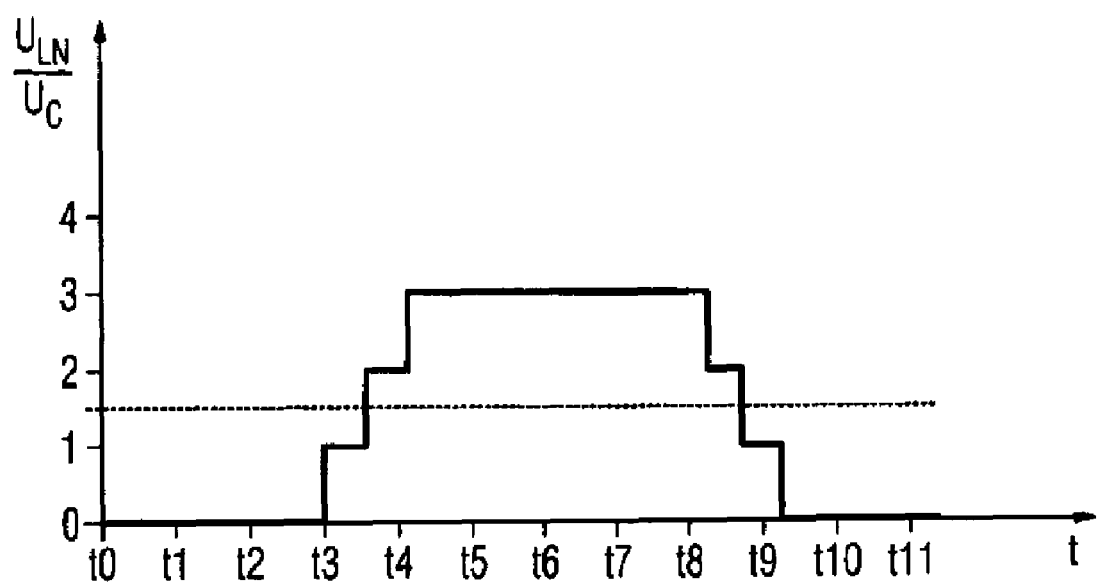
Figure 11:
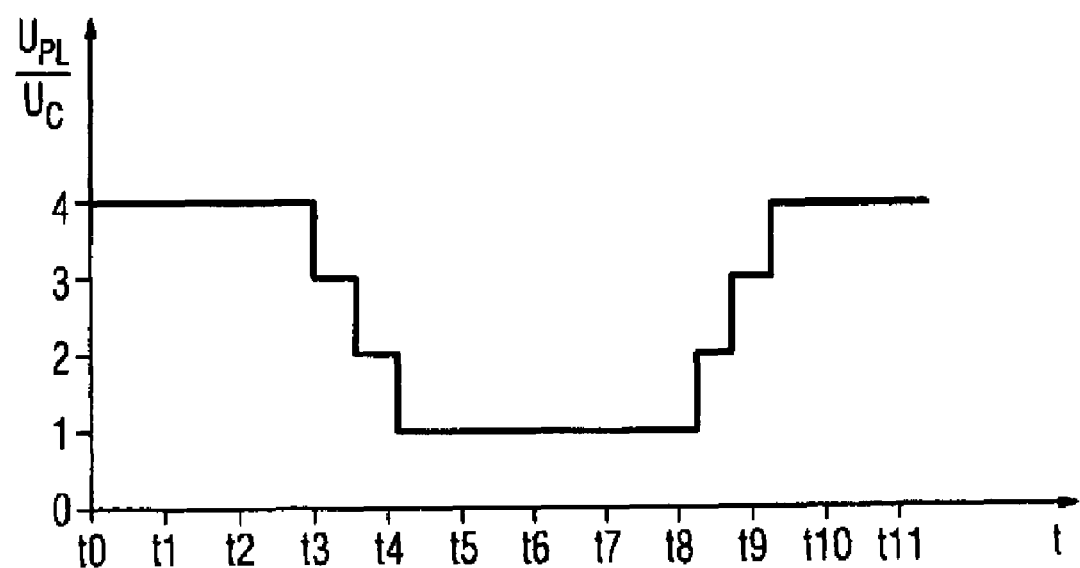
Figure 12:
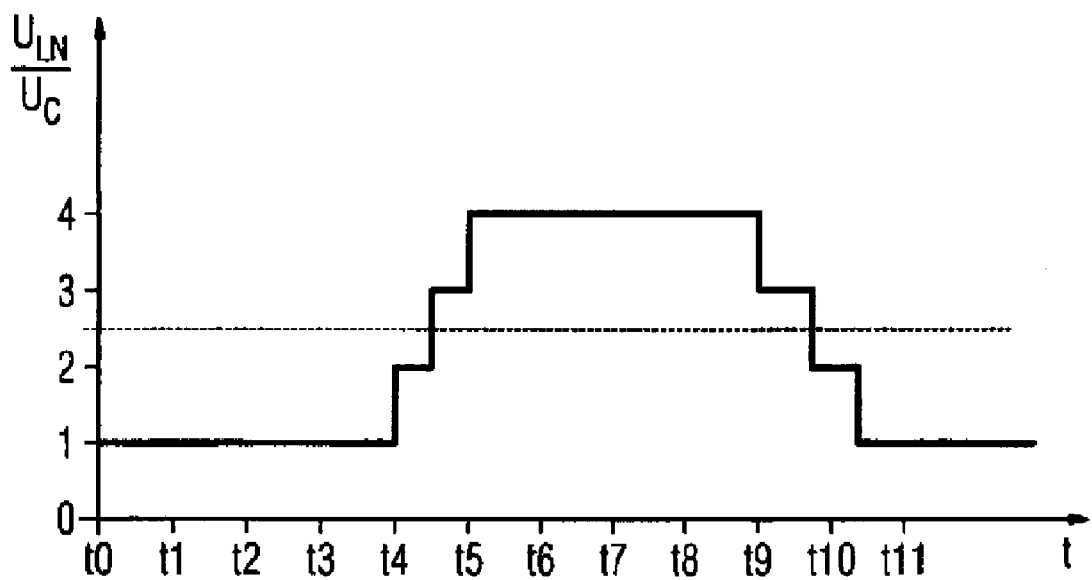
FIGS. 12 and 13 show the potential profiles as shown in FIGS. 8 and 9, in each case in a graph plotted against time t, in which the switching times of the control signals are additionally offset in time.
Figure 13:
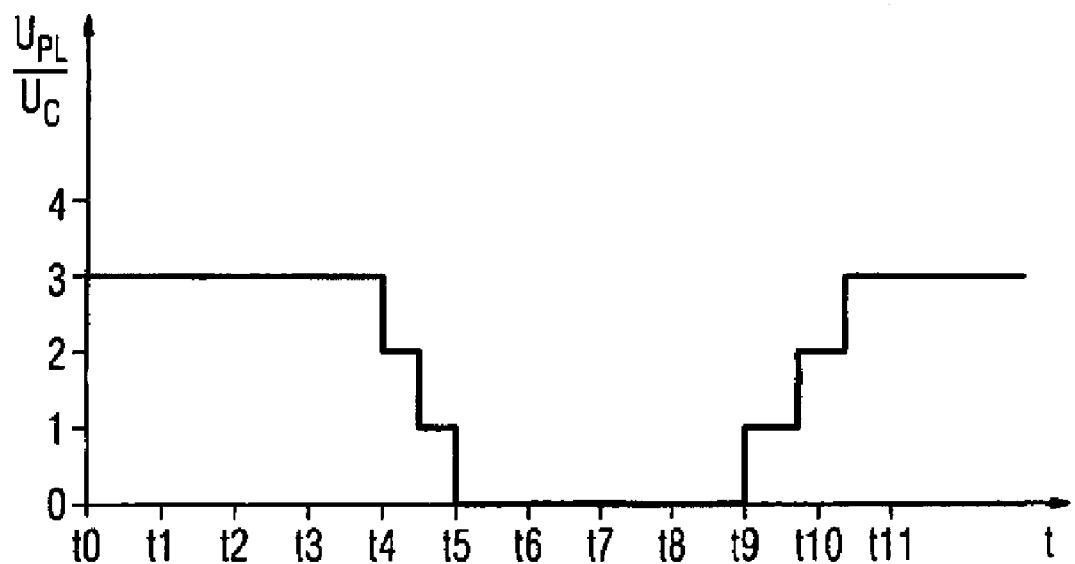

In order to prevent this, the polyphase converter with distributed energy stores 9 is controlled according to the invention. To do this, it is first of all necessary to determine which respective valve branch T1, T2; T3, T4 or T5, T6 of a phase module 100 has a faulty subsystem 10. A subsystem 10 such as this may occur in the respective valve branch T2, T4 or T6, or in the respective valve branch T1, T3 or T5. If a faulty subsystem 10 occurs in the respective valve branch T2, T4 or T6, the associated potential profiles $U_{L1N}/U_C(t)$, $U_{L2N}/U_C(t)$ or $U_{L3N}/U_C(t)$, respectively, correspond to the profile in the graph shown in FIG. 6. If a faulty subsystem 10 occurs in the respective valve branch T1, T3 or T5, the potential profiles $U_{PL1}/U_C(t)$, $U_{PL2}/U_C(t)$ or $U_{PL3}/U_C(t)$ correspond to the profile in the graph shown in a corresponding manner in FIG. 9.

Once it has been found which of the valve branches T1, ..., T6 has a faulty subsystem 10, a respectively corresponding number of the faulty subsystems 10 which have occurred in the respective valve branch T2 or T1 are likewise driven, for example, in the respective valve branches T4 and T6, as well as T3 and T5 which correspond to this faulty valve branch T2 or T1, such that their terminal voltage $U_{x21}=0$. The DC voltage which is applied between the DC voltage busbars $P_0$ and $N_0$ is therefore split in all the phase modules 100 of the polyphase converter with distributed energy stores 9 between the same number of subsystems 10 in each case. This control according to the invention of the polyphase converter with distributed energy stores 9 means that the balance conditions are maintained even in the event of a fault, so that the difference voltages between the load connections L1, L2 and L3 do not have any harmonic or DC voltage components which can be divided by three. This means that it is not possible to tell for a connected load whether the polyphase converter with distributed energy stores 9 is operating with a fault or without any faults. The polyphase converter with distributed energy stores 9 is therefore operated redundantly.

Figure 7:
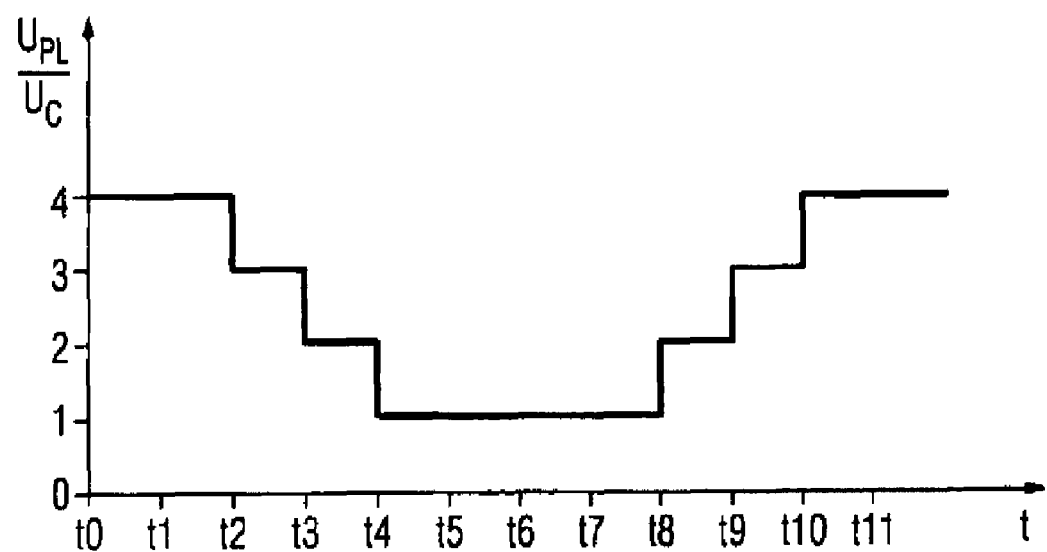
Figure 8:
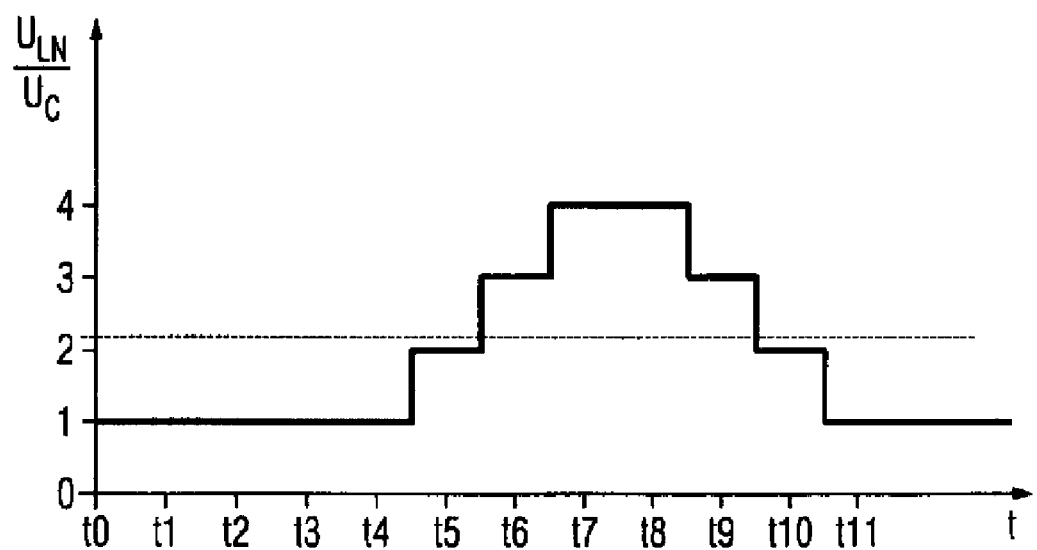

If the aim is to maintain the correct DC voltage between the DC voltage busbars $P_0$ and $N_0$ and the voltage load on the semiconductor switches 1 and 3 which can be turned off in the subsystems 10 of the phase modules 100 in a polyphase converter with distributed energy stores 9 even in the event of a fault, then, in the faulty phase module 100, a respective valve branch T1, T3 or T5, or T2, T4 or T6, which corresponds to the faulty respective valve branch T2, T4 or T6, or T1, T3 or T5, with a corresponding number of subsystems to the number of faulty subsystems 10 being driven such that their terminal voltage is given by $U_{x21}=U_C$. A corresponding procedure is used in the sound phase modules 100 of the polyphase converter with distributed energy stores 9. This additional method step from the method according to the invention results in the number of subsystems 10 which are being used when the phase modules 100 in this polyphase converter with distributed energy stores 9 are faulty and sound being the same again. In consequence, the respective potential profiles $U_{L1N}/U_C(t)$, $U_{Pl1}/U_C(t)$ and $U_{L2N}/U_C(t)$, respectively and $U_{PL2}/U_C(t)$, $U_{L3N}/U_C(t)$ and $U_{PL3}/U_C(t)$, respectively, once again correspond to the profiles in the graphs shown in FIGS. 6 and 7. If one subsystem 10 in the respective valve branch T1, T3 or 5 fails and if the polyphase converter with distributed energy stores 9 is operated using the advantageous control method according to the invention, then the potential profiles $U_{L1N}/U_C(t)$, $U_{PL1}/U_C(t)$ and $U_{L2N}/U_C(t)$ and $U_{PL2}/U_C(t)$, $U_{L3N}/U_C(t)$ and $U_{PL3}/U_C(t)$ correspond to the profiles in the graphs in FIGS. 8 and 9. The potential profiles in the graphs in FIGS. 6, 8 and 7, 9 therefore correspond to the profiles in the graphs in FIGS. 4 and 5 with the difference that, for example, one subsystem 10 is used to a lesser extent for generation of the potential profiles during faulty operation. This means that the output voltages $U_{L1N}$, $U_{L2N}$ and $U_{L3N}$ of the polyphase converter with distributed energy stores 9 produces somewhat less amplitude when faulty. The difference from operation in the sound state corresponds to the capacitor voltage $U_C$ of a subsystem 10. The greater the number of subsystems 10 being used in normal operation for generation of the output voltages $U_{L1N}$, $U_{L2N}$ and $U_{L3N}$ of the polyphase converter with distributed energy stores 9, the lower is the amplitude reduction when operating with a fault.

If, however, the intention is to maintain the undisturbed amplitude of the fundamental of each output voltage $U_{L1N}$, $U_{L2N}$ and $U_{L3N}$ that is produced in the polyphase converter with distributed energy stores 9 approximately, then the advantageous control method according to the invention is modified such that the switching times of the control signals for the semiconductor switches 1 and 3 which can be turned off in the subsystems 10 of the valve branches T1, ..., T6 are additionally offset in time. The potential profiles produced in this way are illustrated in the graphs in FIGS. 10, 11, 12 and 13.

As explained by way of example, this control method according to the invention is not restricted to failure of just one subsystem 10 in one valve branch T1, ..., T6 in the polyphase converter with distributed energy stores 9. As described, this control method results in output voltages $U_{L1N}$, $U_{L2N}$ and $U_{L3N}$ being generated even when a plurality of subsystems 10 in one valve branch T1, T2, T3, T4, T5 or T6 have failed. Care should be taken to ensure that the remaining number of subsystems 10 in a valve branch T1, ..., T6 does not become less than three, in order to ensure that the amplitudes of the harmonics in the respective output voltages $U_{L1N}$, $U_{L2N}$ and $U_{L3N}$ remain low.

This control method according to the invention for polyphase converters with distributed energy stores 9 is particularly advantageous for power supply systems. Converters such as these include converters for power supply system couplings, for power factor correction and for voltage stabilization in power supply systems. Because of the high voltage in conventional power supply systems, a polyphase converter with distributed energy stores 9 has a large number of subsystems 10 in each valve branch T1, ..., T6, for example from 10 to more than one hundred.

What is claimed is:

1. A method for controlling a converter having at least two phase modules, each phase module having a first and a second valve branch wherein each of the first and second valve branches has at least three series-connected two-pole subsystems, in the event of a failure of at least one subsystem of a valve branch, the method comprising the steps of:

identifying a failed valve branch of a phase module having at least one failed subsystem, said at least one failed subsystem located in a first valve branch of a phase module, controlling at least one subsystem in a corresponding first valve branch of each of the others of the at least two phase modules so as to cause a terminal voltage of the at least one subsystem in the corresponding first valve branch of the other phase modules to be zero, controlling at least one subsystem in each of the second valve branches so as to cause a terminal voltage of the subsystems in each of the second valve branches to be equal to a capacitor voltage of the subsystem sequentially controlling the two-pole subsystems of a valve branch of a phase module with control signals having a mutual time offset so as to change an output voltage of the valve branch.

2. The method of claim 1, wherein a number of the subsystems in the first valve branches that have not failed and having a zero terminal voltage, and a number of the subsystems in the second valve branches having a terminal voltage equal to the capacitor voltage is equal to a number of failed subsystems of the first valve branch.

* * * * *